No. 893,858. PATENTED JULY 21, 1908.
F. C. MILLER.
BRAKE.
APPLICATION FILED JAN. 28, 1907.
2 SHEETS—SHEET 1.
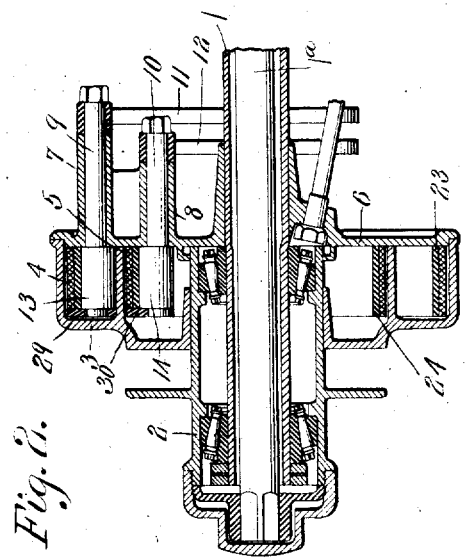
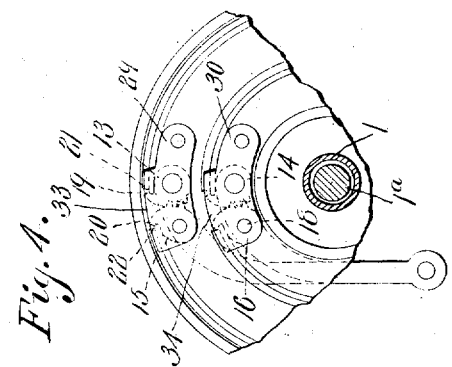
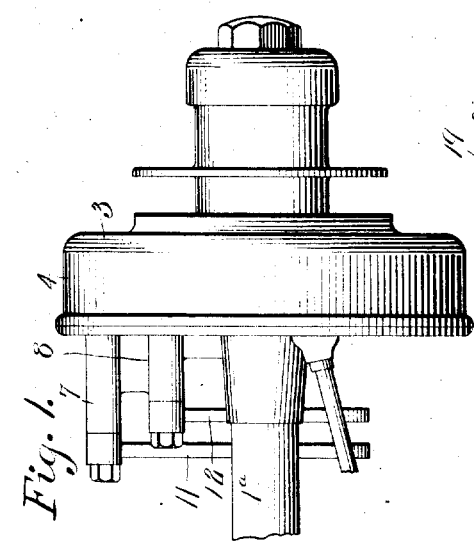
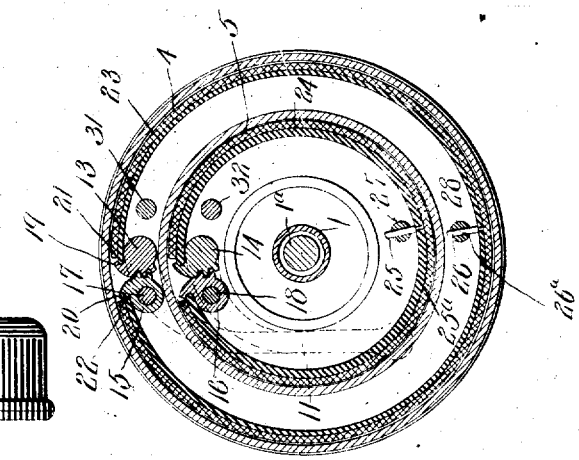
Witnesses
Jos. F. Collins
H. W. Simms
Inventor
F. C. Miller
By Knight Bros
Attorneys No. 893,858.
PATENTED JULY 21, 1908.
F. C. MILLER.
BRAKE.
APPLICATION FILED JAN. 28, 1907.
2 SHEETS—SHEET 2.
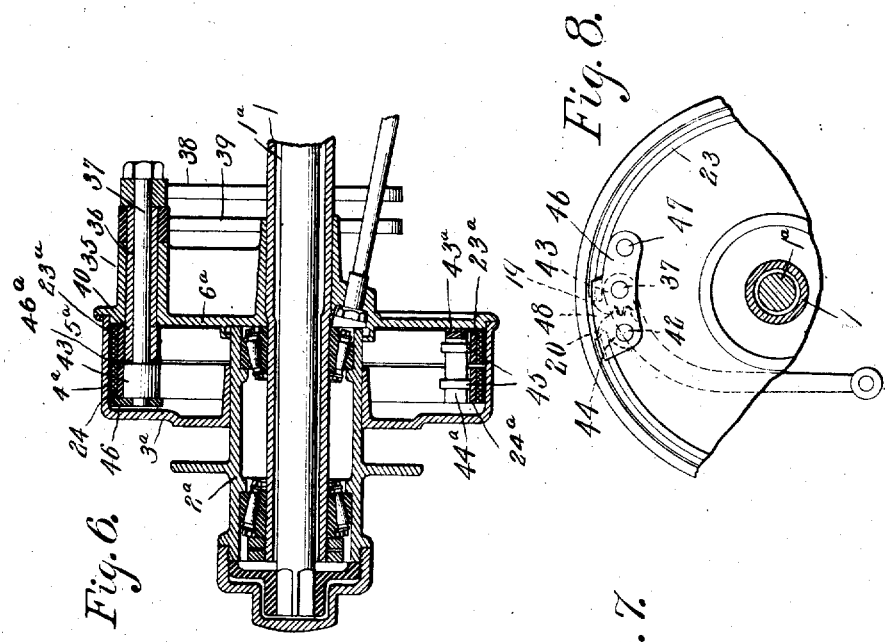
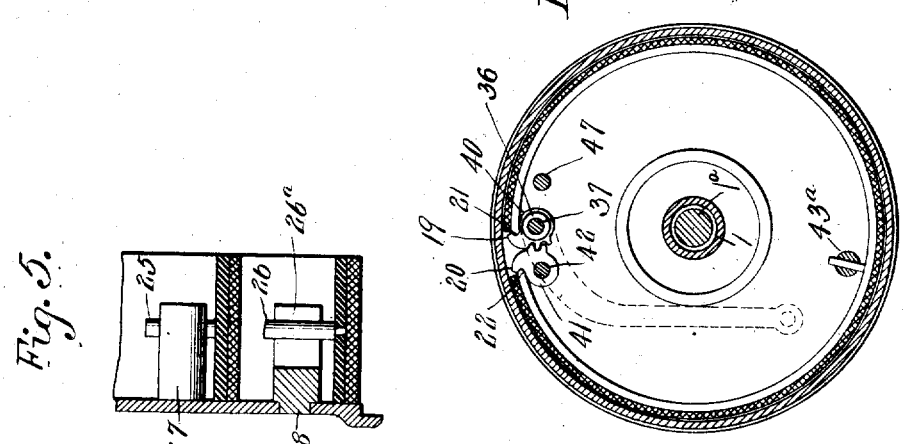
Witnesses
Jos. F. Collins.
H. H. Simms
Inventor
F. C. Miller
By Knight Bros
Attorneys

UNITED STATES PATENT OFFICE.

FREDERICK C. MILLER, OF CINCINNATI, OHIO.

BRAKE.

No. 893,858.      Specification of Letters Patent.      Patented July 21, 1908.

Application filed January 28, 1907. Serial No. 354,545.

*To all whom it may concern:*

Be it known that I, FREDERICK C. MILLER, a citizen of the United States, and resident of Cincinnati, county of Hamilton, and State of Ohio, have invented certain new and useful Improvements in Brakes, of which the following is a specification.

This invention relates to vehicle brakes and more particularly to that type in which a band is expanded to be thrown into frictional engagement with an annular braking face carried by a rotated part.

An object of this invention is to provide a construction by which great power may be secured to apply the brake.

Another object is to provide a construction by which the parts may be taken apart so as to be cleaned or to be repaired.

Other and further objects will appear in the following description and will be more particularly pointed out in the appended claims.

In the drawings: Figure 1 is an elevation of an axle of an automobile and a hub with my invention applied thereto; Fig. 2 is an axial section of the embodiment as shown in Fig. 1; Fig. 3 is a transverse section of the same embodiment; Fig. 4 is a detail view showing the plates connecting the ends of the sectors; Fig. 5 is a detail sectional view of the means for holding the braking ring against undue movement; Fig. 6 is an axial section of another embodiment of my invention; Fig. 7 is a transverse section of this latter embodiment; and Fig. 8 is a detail view of the plate connecting the free ends of the sectors.

While I herein show and describe my invention as applied to an automobile rear axle of the "floating type," I desire it to be understood that the same is applicable to other types of automobile axles and with slight changes to various sorts of mechanisms.

Referring more particularly to the embodiment as shown in Figs. 1 to 5, 1 indicates the hollow axle or stationary part containing a "floating" driving shaft 1ª and 2 the hub or rotating part. The rotating part 2 carries a housing 3 which is provided with two internal concentric annular braking faces 4 and 5. The axle 1 carries a disk 6 from one face of which extends a pair of integral bosses 7 and 8. In these bosses are journaled the shafts 9 and 10 respectively, which have extending laterally from one of their ends, arms 11 and 12 respectively. From that face of the disk 6 opposite that which carries bosses 7 and 8 extend sectors 13 and 14 which are secured to the shafts 9 and 10 respectively so as to turn with said shafts. These sectors 13 and 14 mesh respectively with the sectors 15 and 16 which are journaled on studs 17 and 18 extending from the disk 6. It will be noted that these sectors are arranged in pairs and the members of each pair have extending in opposite directions from their peripheries, lugs 19 and 20, which are provided with grooves 21 and 22, to receive the ends of one of the split rings 23 and 24. These split rings 23 and 24 are adapted to fit within the annular braking faces 4 and 5 respectively and when the shafts 9 and 10 are rotated by the arms 11 and 12, said rings are expanded so as to be thrown into firm engagement with the annular braking faces, this being caused by the lugs 19 and 20 which separate the ends of the split rings when the shafts 9 and 10 are rotated in one direction. The split rings may be constructed in any suitable manner but it is preferred to cover their frictional face with leather or like material.

To prevent the split rings moving unduly when they are not being employed to brake the rotating part, I provide the following means: Each split ring carries, at a point approximately diametrically opposite the split in the ring, an inwardly extending pin or projection 25 or 26, which pins or projections work in slots 25ª and 26ª respectively in studs 27 and 28 extending from a face of the disk 6. This arrangement permits of the split rings being moved axially from the disk 6, when the rotating part or hub is removed from the axle. To provide means to support the free ends of the sectors, I employ plates 29 and 30. These plates are rigidly secured to the ends of the studs 31 and 32 located on the sides of the sectors, 13 and 14, opposite the sides on which the studs 17 and 18 are positioned, the ends of the sectors 13 and 14 being journaled in the plates. These plates are provided with upward extensions 33 and 34 which cover the splits in the rings 23 and 24 and serve as a means for preventing the ends of the rings moving out of engagement with the lugs of the sectors. To remove the ends of the split rings from behind the extensions 33 and 34, it is necessary first to remove the rotating member and then to rotate the sectors in a direction to expand the ring. This carries the ends of the rings beyond the ends of the extensions 33 and 34 and it is then only necessary to move the rings axially away from the disk. In the embodiment of the invention as shown in Figs. 6 to 8, $1^a$ indicates the axle and $2^a$ the hub carrying the housing $3^a$. In this embodiment, the annular braking surfaces $4^a$ and $5^a$ are in alinement or in other words, side by side. The disk $6^a$ is provided with but one integral hollow boss 35 in which is journaled a hollow shaft 36 which in turn has journaled therein a shaft 37. These shafts have extending therefrom, arms 38 and 39 respectively, the solid or inner shaft 37 being extended beyond the outer end of the shaft 36 for the purpose of permitting the arm 38 to be secured thereto. The inner end of the hollow shaft 36 carries a sector 40 which meshes with a sector 41 journaled on a stud 42 extending from that face of the disk opposite the face from which the hollow boss 35 extends. The inner end of the shaft 37 is extended beyond the inner end of the hollow shaft 36 and carries a sector 43 which meshes with a sector 44 also journaled on the stud 42. It will be noted that these sectors are arranged in pairs, the axes of the pairs being alined. The members of each pair have lugs 19 and 20 as in the other embodiment and the outer faces of these lugs are provided with grooves 21 and 22 respectively to receive the ends of split rings $23^a$ and $24^a$.

In the embodiment shown in Figs. 6 to 8, as in the other embodiment, I provide means for preventing the split rings moving too far away from their annular braking surfaces. This means comprises a stud $43^a$ extending over both rings $23^a$ and $24^a$, and provided throughout the greater portion of its length with a slot $44^a$. This slot is adapted to receive both lugs or pins 45 extending from the two rings $23^a$ and $24^a$. This means, as in the other embodiment, permits the split rings to be removed from the disk by withdrawing them in an axial direction.

The free ends of the sectors are spaced apart by a plate 46, which is rigidly secured to the stud 42 and to a supporting stud 47 extending from the face of the disk $6^a$ but provides a journal bearing for the sector 43. This plate also carries an extension 48 which covers the ends of the split ring and which serves the same function as the extensions 33 and 34 on the plates 29 and 30 of the first described embodiment. Arranged between the split rings $23^a$, $24^a$ is a plate $46^a$ which is thinner than the plate 46 but has the same form and functions and in addition acts to keep the rings $23^a$, $24^a$ separated.

The arms on the sector-operated shaft in both embodiments are connected to any suitable operating mechanism. It will be noted that the pressure on the braking surfaces may be controlled to a nicety. Should only a slight braking action be desired, either one of the split rings may be thrown into action. If a strong braking action is desired, both of the split rings may be thrown into action.

Having thus described my invention, what I claim as new therein and desire to secure by Letters Patent is:—

1. The combination of the stationary and rotary members, one of which is provided with an internal annular braking surface and the other of which carries a pair of intermeshing sectors constructed with eccentrically located and oppositely presented grooves, a split ring surrounded by the internal braking surface and having its extreme ends engaged with and confined by the grooves in the sectors, and means for operating the sectors.

2. The combination with the stationary member, of a rotary member carrying an internal annular braking surface, a split braking ring surrounded by the annular braking surface, means for engaging the ends of the ring to expand said ring against said braking surface, a pin extending inwardly from said ring, and a slotted stud extending laterally from the stationary member and having the pin on the ring working in the slot.

3. The combination with a stationary axle and a driving shaft, of a hub rotated by the driving shaft and carrying a housing having an internal braking surface, a split braking ring, a pair of sectors journaled on and extending from the stationary member and engaging the split ring to operate the same, and a plate connecting the free ends of the sectors.

4. The combination with an axle and a driving shaft, of a hub rotated by the driving shaft and carrying a housing having an internal braking surface, a split braking ring surrounded by the internal braking surface, a pair of sectors journaled on and extending from the stationary member and engaging the split ring to operate the same, and a plate connecting the sectors and having an extension which holds the free ends of the ring to the sectors.

5. The combination with a stationary member, of a rotary member, a pair of braking rings arranged side by side, means carried by the rotary member to be engaged by the split rings to produce a braking action, a hollow shaft journaled in the stationary member, a shaft journaled in the hollow shaft, connection between the hollow shaft and one of the rings for expanding said ring, and connection between the other shaft and the other ring for expanding the latter ring.

The foregoing specification signed at Newport Ky. this 5th day of December,

FREDERICK C. MILLER.

In the presence of two witnesses—
HENRY C. PETERS,
LAWRENCE J. DISKIN.